(12) United States Patent
Juan

(10) Patent No.: US 7,831,848 B2
(45) Date of Patent: Nov. 9, 2010

(54) POWER MANAGEMENT SYSTEM FOR USE IN LAPTOP COMPUTER AND MANAGEMENT METHOD THEREOF

(75) Inventor: Kuan-Chi Juan, Sijhih (TW)

(73) Assignee: Acer Incorporated, Taipei Hsien (TW)

( * ) Notice: Subject to any disclaimer, the term of this patent is extended or adjusted under 35 U.S.C. 154(b) by 695 days.

(21) Appl. No.: 11/822,746

(22) Filed: Jul. 10, 2007

(65) Prior Publication Data
US 2008/0034241 A1 Feb. 7, 2008

(30) Foreign Application Priority Data
Aug. 7, 2006 (TW) ................ 95128914 A

(51) Int. Cl.
*G06F 1/00* (2006.01)
*G06F 1/26* (2006.01)
(52) U.S. Cl. ............ 713/300; 713/320; 713/323
(58) Field of Classification Search ........... 713/323
See application file for complete search history.

(56) References Cited
U.S. PATENT DOCUMENTS
4,649,334 A * 3/1987 Nakajima ............ 323/299

| | | | |
|---|---|---|---|
| 6,326,097 B1 * | 12/2001 | Hockaday | 429/34 |
| 6,696,771 B2 * | 2/2004 | Acharya et al. | 307/140 |
| 6,904,532 B2 * | 6/2005 | Matsumoto | 713/320 |
| 7,242,111 B2 * | 7/2007 | Menas et al. | 307/38 |

FOREIGN PATENT DOCUMENTS
JP 08095681 A * 4/1996

OTHER PUBLICATIONS

Shinpei Kunii, Portable Electronic Equipment, Apr. 12, 1996, Japenese Patent English translation, pp. 1-10.*

* cited by examiner

*Primary Examiner*—Suresh K Suryawanshi
(74) *Attorney, Agent, or Firm*—Alan Kamrath; Kamrath & Associates PA

(57) ABSTRACT

A power management system for use in a laptop computer and its power management method include an external power apparatus and a control unit and a switch disposed in the laptop computer. The external power apparatus is pluggable and supplies direct current (DC) between 5 and 1.8 DC voltages to the laptop computer. The switch can turn on/off the direct current to at least one DC voltage point within the laptop computer based on a control signal sent from the control unit.

9 Claims, 4 Drawing Sheets

POWER MANAGEMENT SYSTEM FOR USE IN LAPTOP COMPUTER AND MANAGEMENT METHOD THEREOF

FIELD OF THE INVENTION

The present invention relates to a power management system for use in a laptop computer and a management method thereof and, more particularly, to a technical area that controls an external power apparatus.

BACKGROUND OF THE INVENTION

At present, a certain level of advancement and result is achieved in the area of power management for a battery of a laptop computer. However, the extended using time of the battery with a fixed quantity of power is very limited, even though good power management methods are provided for hardware components, software operating systems or driver programs.

There are different power management methods, and most of them allow the components temporarily not in use to enter a power saving mode or a sleep mode to save the power consumption of a battery. These methods that adopt a power saving mode or a sleep mode are nothing more than focusing on voltage or frequency. However, the functions of present laptop computers become more powerful, and the power consumption of the laptop computers becomes larger. Thus, existing methods adopting the power saving mode or sleep mode no longer can meet the expected power saving effect anymore.

In view of the problems of the prior art, the present invention provides a power management system for use in a laptop computer and a power management method to overcome the foregoing shortcomings.

SUMMARY OF THE INVENTION

Therefore, it is a primary object of the present invention to overcome the shortcomings of a prior art battery with a fixed quantity of electric power by providing a lightweight and convenient pluggable external power apparatus for supplying more power to a laptop computer. Therefore, a fuel battery or a solar energy battery becomes a solution for the aforementioned problem.

However, further improvements are needed for the fuel battery or solar energy battery to generate the same quantity of electric power as those generated by a lithium battery. If it is desired to use a battery together with an external power apparatus for supplying power alternately to achieve the required power requirement, it is necessary to make substantial modifications to the power circuit of the laptop computers, and such modifications may easily cause a serious incompatibility issue to the power design of related components in existing laptop computers. Furthermore, such large modification to the circuit design of the laptop computers requires a series of tests and certifications, thus reducing the possibility of achieving a mass production in a short time for a time-to-market product development.

In view of the foregoing shortcomings, the present invention provides an external power apparatus capable of directly supplying a DC voltage such as 5 volts, 3.3 volts, 2.5 volts or 1.8 volts to a subsystem in a laptop computer. If a small power fuel battery or solar energy battery is included into the external power apparatus and connected in parallel with the DC power subsystem for supplying electric power, the power supply of the battery installed in the laptop computer can be shared. In addition, the required DC voltage of the subsystem is constant, and, thus, such parallel connection method is much simpler than the aforementioned circuit design for the mixed power supply. In other words, the present invention can avoid substantial modifications to the circuit design and overcomes the time-to-market problem.

As to the laptop computer, a USB interface, a PCMCIA interface or a card interface is a prerequisite input/output port. If the USB interface, PCMCIA interface or card interface is used for connecting the external power apparatus and the laptop computer, the external power apparatus can be connected in parallel with the subsystem in the laptop computer for supplying electric power. This is another object of the present invention.

The invention avoids the external power apparatus from supplying power when the laptop computer is turned off, which may cause damage to circuits and components easily.

Another object of the present invention is to install a control unit and a switch on a laptop computer for turning on/off the power of the external power apparatus and protecting a subsystem circuit in the laptop computer, so as to avoid the impact of unnecessary leakage currents. In other words, if the laptop computer is turned on and the DC voltage at the DC voltage point in the subsystem becomes stable (such as 5 volts), the control unit will send a control signal to a switch, such that the DC voltage of the external power apparatus can be supplied to the laptop computer for a power supply. If the laptop computer is turned off, the control unit will send another control signal to the switch to turn off the external power apparatus and stop supplying a DC voltage to the laptop computer for the power supply.

To make it easier to understand the technical characteristics and performance of the present invention, preferred embodiments are used together with the accompanying drawings for the detailed description of the invention.

DETAILED DESCRIPTION OF THE PREFERRED EMBODIMENTS

The above and other objects, features and advantages of the present invention will become apparent from the following detailed description of preferred embodiments taken with the accompanying drawings, and the same numerals are used to indicate the same elements for the illustration of the invention.

Figure 1:
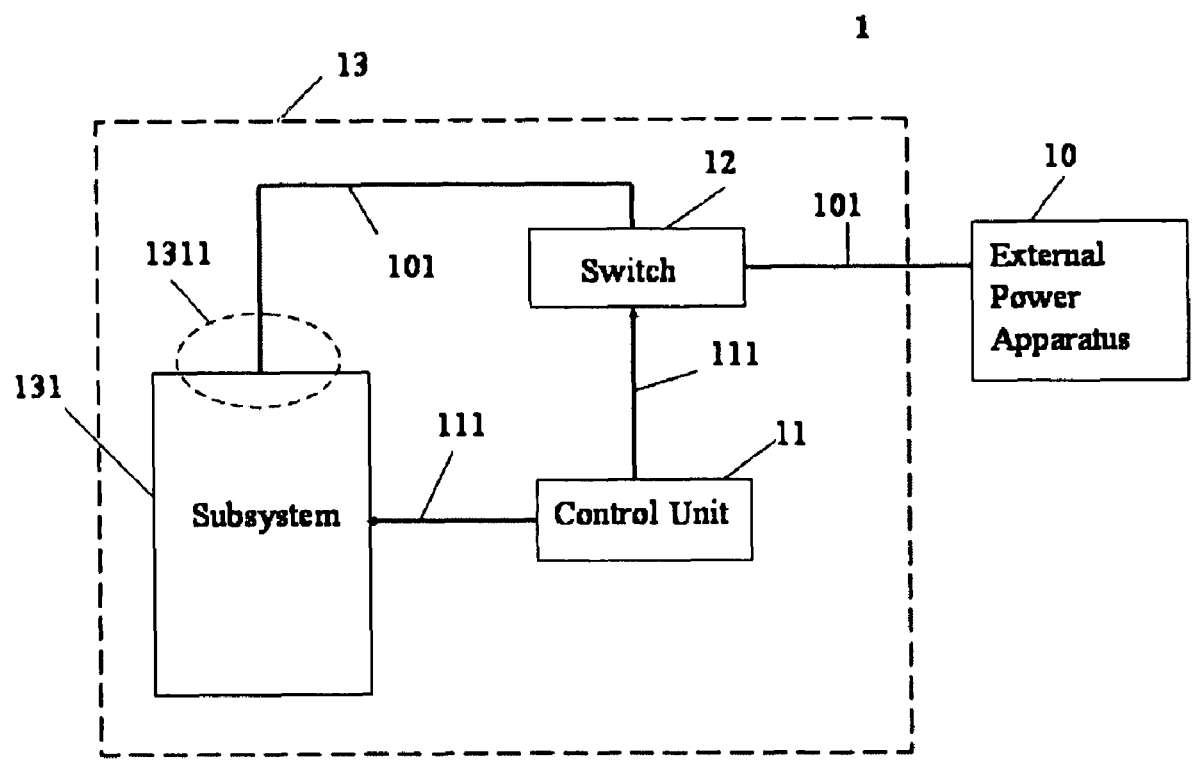
FIG. 1 is a schematic block diagram of a power management system of a laptop computer in accordance with the present invention.

Referring to FIG. 1 for a schematic block diagram of a power management system 1 of a laptop computer 13 in accordance with the present invention, the power management system 1 comprises an external power apparatus 10, a control unit 11 and a switch 12. The control unit 11 and the switch 12 can be disposed in the laptop computer 13 and connected to a subsystem 131 in the laptop computer 13. In this embodiment, the external power apparatus 10 can be installed to the laptop computer 13 through an interface such as a USB interface, a PCMCIA interface or a card interface for providing a pluggable function to the external power apparatus 10 and supplying a DC voltage 101 to the laptop computer 13. In addition, the switch 12 can turn on/off the DC voltage 101 and can be connected in parallel with at least one DC voltage point 1311 in the subsystem 131 based on a control signal 111 sent from the control unit 11. It is noteworthy to point out that the DC voltage 101 falls within a range from 5 volts to 1.8 volts and the common voltage supplied to a DC voltage point 1311 is equal to 5 volts, 3.3 volts, 2.5 volts or 1.8 volts. Moreover, the external power apparatus 10 includes a fuel battery or a solar energy battery, and the design of the battery mainly takes the convenience and quick charging effect of the battery into consideration. Furthermore, the control unit 11 can use a firmware within a South Bridge chip in the laptop computer 13 or an independent firmware of an embedded controller in the laptop computer 13 to control and send out the required control signal 111 to the switch 12 or other DC power switches in the subsystem 131. The switch 12 can be shared by a current limit chip or a current limit switch in the laptop computer 13 to save the hardware cost of the switch 12.

Figure 2:
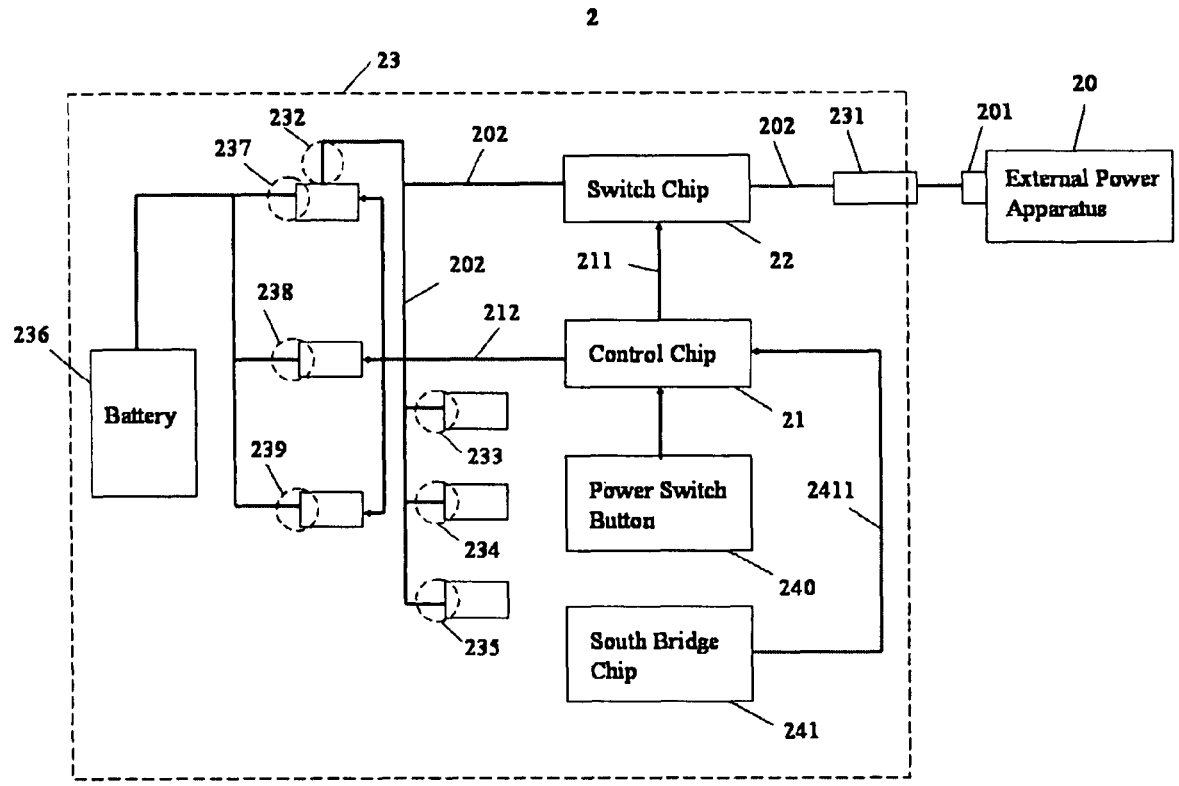
FIG. 2 is a schematic block diagram of a power management system of a laptop computer in accordance with a preferred embodiment of the present invention.

Referring to FIG. 2 for a schematic block diagram of a power management system 2 of a laptop computer 23 in accordance with a preferred embodiment of the present invention, the power management system 2 comprises an external power apparatus 20 having a USB port 201, a control chip 21 and a switch chip 22. The control chip 21 and the switch chip 22 are installed in the laptop computer 23. In FIG. 2, the USB port 201 of the external power apparatus 20 can be connected to a USB port 231 of the laptop computer 23 for providing a pluggable function to the external power apparatus 20 and supplying a DC voltage 202 in parallel with a plurality of DC voltage points 232, 233, 234, 235 in the laptop computer 23. Furthermore, a battery 236 in the laptop computer 23 can also provide the required electric power to other DC voltage points 237, 238, 239 as shown in FIG. 2. In this embodiment, the external power apparatus 20 is connected by USB interfaces for supplying the 5-volt DC voltage 202. Therefore, the external power apparatus 20 can be connected in parallel with the DC voltage points 232, 233, 234, 235 in the laptop computer 23 by supplying a 5-volt DC voltage 202. Such arrangement can supply a 5-volt DC voltage 202 to the DC voltage points 232, 233, 234, 235 respectively to share the electric power consumption of the battery 236. To avoid the external power apparatus 20 from continuing to supply power and causing a leakage current at the laptop computer 23 or causing damage to electronic components when the laptop computer 23 is turned off, the switch chip 22 switches the 5-volt DC voltage 202 to the DC voltage points 232, 233, 234, 235 based on a control signal 211 sent from the control chip 21. In this embodiment, the control chip 21 determines whether or not the control signal 211 is sent out based on a power switch button 240 of the laptop computer 23 or a control signal 2411 of the South Bridge chip 241 in the laptop computer 23. Furthermore, the control chip 21 can send out another control signal 212 based on a power switch button 240 of the laptop computer 23 or the control signal 2411 of the South Bridge chip 241 in the laptop computer 23 to directly control the battery 236 whether or not to supply electric power to other DC voltage points 237, 238, 239. It is noteworthy to point out that the DC voltage 202 can be modulated within a range from 5 volts to 1.8 volts according to the design requirements, and the common voltage supplied to the DC voltage points 232, 233, 234, 235 can be modulated to 5 volts, 3.3 volts, 2.5 volts or 1.8 volts. Further, the external power apparatus 20 can include a fuel battery or a solar energy battery, and the control chip 21 can use a firmware in the South Bridge chip 241 of the laptop computer 23 or an independent firmware of an embedded controller in the laptop computer 23 to send out the required control signal 211, 212 to the switch chip 22 or other DC power switches in the subsystem. It is noteworthy to point out that the switch chip 22 can share a current limit chip or a current limit switch in the laptop computer 23.

Figure 3:
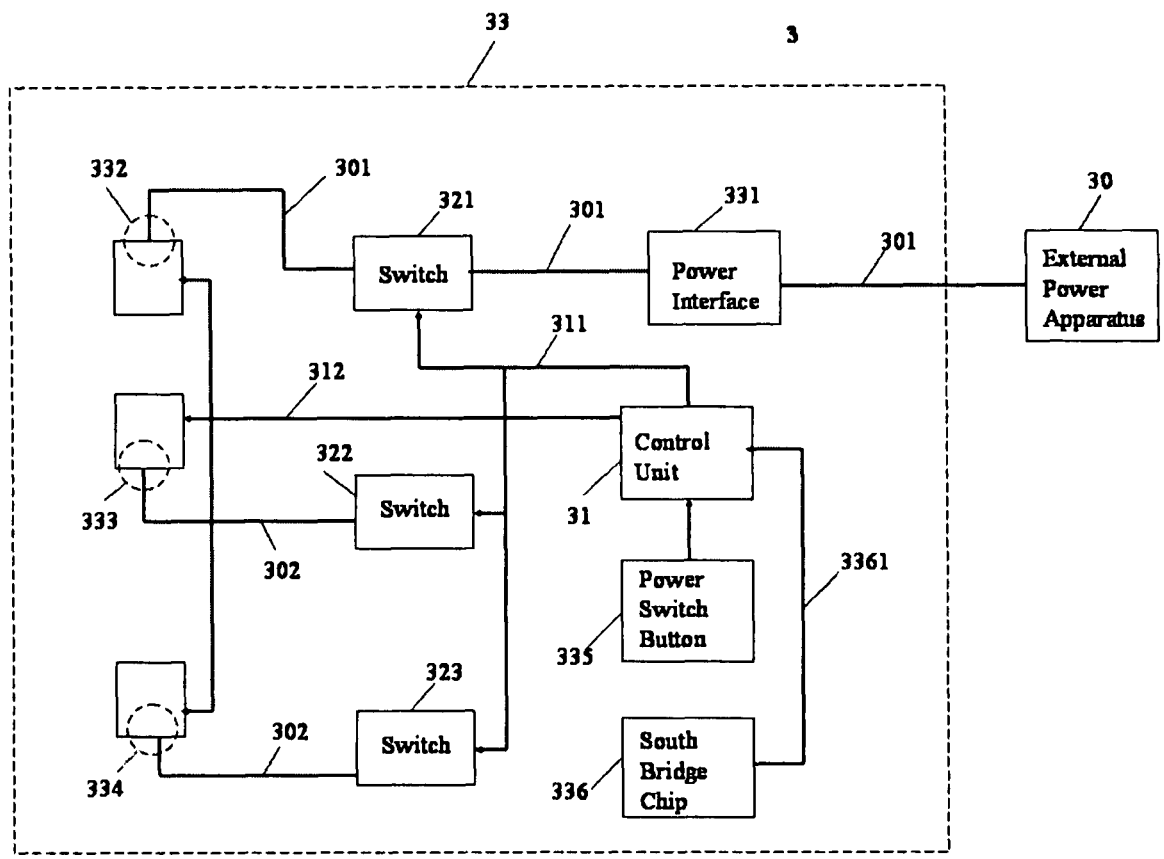
FIG. 3 is a schematic block diagram of a power management system of a laptop computer in accordance with another preferred embodiment of the present invention.

Referring to FIG. 3 for a schematic block diagram of a power management system 3 of a laptop computer 33 in accordance with another preferred embodiment of the present invention, the power management system 3 comprises an external power apparatus 30, a control unit 31 and a plurality of switches 321, 322, 323. The control unit 31 and the switches 321, 322, 323 are installed in the laptop computer. In FIG. 3, the external power apparatus 30 can be connected by a power interface 331 such as a USB interface, a PCMCIA interface or a card interface of a laptop computer 33 for providing a pluggable function to the external power apparatus 30 and supplying a DC voltage 301, 302 through the switches 321, 322, 323, and can be connected in parallel with a DC voltage point 332, 333, 334 in the laptop computer. It is noteworthy to point out that the DC voltage 302 at the DC voltage points 333, 334 can come from the external power apparatus 30 or a battery of the laptop computer 33. To prevent the external power apparatus 30 from continuing to supply power and providing a leakage current to the laptop computer 33 when the laptop computer 33 is turned off, which may easily cause damage to electronic components, the switches 321, 322, 323 selectively turn on/off a DC voltage 301, 302 and are connected in parallel with a DC voltage point 332, 333, 334 based on the control signal 311, 312 sent from the control unit 31. The control unit 31 of this embodiment can determine whether or not the control signal 311, 312 is sent out based on a power switch button 335 of the laptop computer 33 or a control signal 3361 of a South Bridge chip 336 in a laptop computer 33. The DC voltage 301, 302 can be modulated within a range from 5 volts to 1.8 volts according to the requirement at the DC voltage point 332, 333, 334, and the voltage commonly supplied to the DC voltage point 332, 333, 332 can be modulated to 5 volts, 3.3 volts, 2.5 volts or 1.8 volts. Further, the external power apparatus 30 includes a fuel battery or a solar energy battery, and the control unit 31 can use a firmware in the South Bridge chip 336 in the laptop computer 33 or an independent firmware of an embedded controller in the laptop computer 33 to control and send out the required control signal 311, 312 to the switch 321, 322, 323. The switch 321, 322, 323 can be a current limit chip or a current limit switch in the laptop computer 33.

Figure 4:
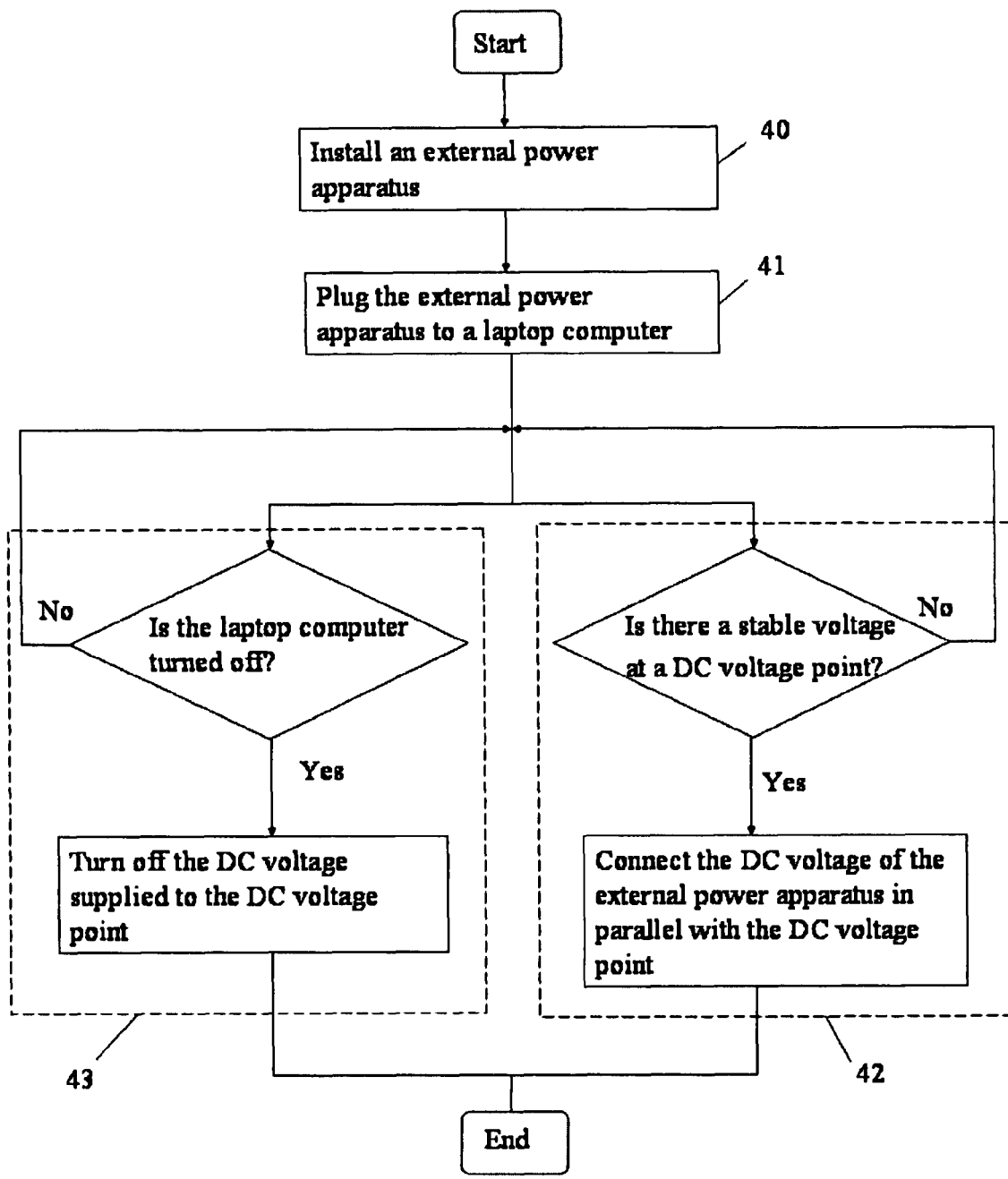
FIG. 4 is a flow chart of a power management method for use in a laptop computer in accordance with the present invention.

Referring to FIG. 4 for a flow chart of a power management method for use in a laptop computer in accordance with the present invention, the power management method comprises the steps of:

Step 40: installing a fuel battery or a solar energy battery in an external power apparatus for externally supplying a DC voltage that falls within a range from 5 volts to 1.8 volts. The common voltage of the DC voltage is equal to 5 volts, 3.3 volts, 2.5 volts or 1.8 volts;

Step 41: plugging an external power apparatus into a corresponding interface slot such as a USB port, a PCMCIA interface slot or a card interface slot of the laptop computer by an interface such as a USB interface, a PCMCIA interface or a card interface;

Step 42: using a control unit, an embedded controller, a control chip or a South Bridge chip to supply a DC voltage of an external power apparatus through the interface and connect the external power apparatus in parallel with the DC voltage point, if a stable voltage is detected or confirmed at a position of at least one DC voltage point of the laptop computer; or Step 43: using a control unit, an embedded controller, a control chip or a South Bridge chip to turn off the DC voltage to be supplied to the DC voltage point, if the power of the laptop computer is detected to be turned off.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management system for use in a laptop computer, comprising:
    an external power apparatus pluggable and supplying a DC voltage to said laptop computer;
    a battery disposed in said laptop computer and supplying said DC voltage to said laptop computer;
    a control unit disposed in said laptop computer; and
    a switch, disposed in said laptop computer, switching said DC voltage supplied by said external power apparatus, said battery, or said external power apparatus and said battery at the same time connected in parallel with at least one DC voltage point in said laptop computer based on a control signal sent from said control unit, wherein said DC voltage falls within a range from 5 volts to 1.8 volts.

2. The power management system of claim 1, wherein said external power apparatus includes a fuel battery or a solar energy battery.

3. The power management system of claim 1, wherein said external power apparatus is pluggable to said laptop computer by a USB interface, a PCMCIA interface or a card interface.

4. The power management system of claim 1, wherein said DC voltage has a voltage of 5 volts, 3.3 volts, 2.5 volts or 1.8 volts.

5. The power management system of claim 1, wherein said control unit is an embedded controller.

6. The power management system of claim 1, wherein said control unit is installed in a South Bridge chip in said laptop computer.

7. The power management system of claim 1, wherein said switch is installed at a current limit chip or a current limit switch in said laptop computer.

8. A power management method for use in a laptop computer, comprising:
    plugging an external power apparatus having a USB port into a USB port of said laptop computer;
    disposing a battery in said laptop computer; and
    connecting said external power apparatus and said battery in parallel with a DC voltage point supplied with a DC voltage if a stable voltage is detected or confirmed at the DC voltage point of said laptop computer, or turning off said DC voltage to be supplied to said DC voltage point if the power of said laptop computer is detected to be turned off, wherein said DC voltage falls within a range from 5 volts to 1.8 volts.

9. A power management system for use in a laptop computer, comprising:
    an external power apparatus having a fuel battery or a solar energy battery, with the external power apparatus pluggable and supplying a DC voltage to said laptop computer;
    a battery disposed in said laptop computer and supplying said DC voltage to said laptop computer;
    a control unit in a form of an embedded controller and disposed in said laptop computer; and
    a plurality of switches, disposed in a current limit chip or a current limit switch of said laptop computer, switching said DC voltage supplied by said external power apparatus, said battery, or said external power apparatus and said battery at the same time based on a control signal sent from said control unit, and connected in parallel with at least one DC voltage point in said laptop computer, wherein said DC voltage falls within a range from 5 volts to 1.8 volts.

* * * * *